(12) United States Patent
Katase

(10) Patent No.: US 12,079,056 B2
(45) Date of Patent: Sep. 3, 2024

(54) TEMPERATURE ABNORMALITY DETECTION CIRCUIT DEVICE

(71) Applicant: SEIKO EPSON CORPORATION, Tokyo (JP)

(72) Inventor: Makoto Katase, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 92 days.

(21) Appl. No.: 17/969,076

(22) Filed: Oct. 19, 2022

(65) Prior Publication Data

US 2023/0130982 A1   Apr. 27, 2023

(30) Foreign Application Priority Data

Oct. 21, 2021 (JP) .................. 2021-172193

(51) Int. Cl.
*G06F 1/00* (2006.01)
*G06F 1/20* (2006.01)
*G06F 1/3206* (2019.01)

(52) U.S. Cl.
CPC .......... *G06F 1/3206* (2013.01); *G06F 1/206* (2013.01)

(58) Field of Classification Search
CPC ...... G06F 1/3206; G06F 1/206; G06F 1/3215; G06F 1/3287; G06F 1/20; Y02D 10/00
See application file for complete search history.

(56) References Cited

U.S. PATENT DOCUMENTS

| | | | | |
|---|---|---|---|---|
| 2006/0289862 | A1* | 12/2006 | Yoshida | H01L 25/162 257/E23.08 |
| 2009/0177445 | A1* | 7/2009 | Capps, Jr. | G06F 1/206 716/136 |
| 2012/0185719 | A1 | 7/2012 | Taylor et al. | |
| 2013/0159755 | A1* | 6/2013 | Presant | G06F 1/324 713/340 |
| 2016/0134289 | A1 | 5/2016 | Lesea | |
| 2019/0004593 | A1* | 1/2019 | Gomi | G06F 1/3296 |

FOREIGN PATENT DOCUMENTS

| | | |
|---|---|---|
| JP | 2014-506073 A | 3/2014 |
| JP | 2017-536041 A | 11/2017 |
| JP | 2019-12377 A | 1/2019 |
| JP | 2021-072687 A | 5/2021 |

\* cited by examiner

*Primary Examiner* — Nitin C Patel
(74) *Attorney, Agent, or Firm* — Rankin, Hill & Clark LLP

(57) ABSTRACT

A circuit device includes: a plurality of circuit blocks, each circuit block being provided with at least one temperature sensor; and a control circuit controlling the plurality of circuit blocks. Each circuit block performs first feedback control for temperature abnormality detection, based on a temperature detection value of the temperature sensor provided in each circuit block. The control circuit performs second feedback control for temperature abnormality detection to each circuit block of the plurality of circuit blocks, based on the temperature detection value of the temperature sensor.

9 Claims, 14 Drawing Sheets

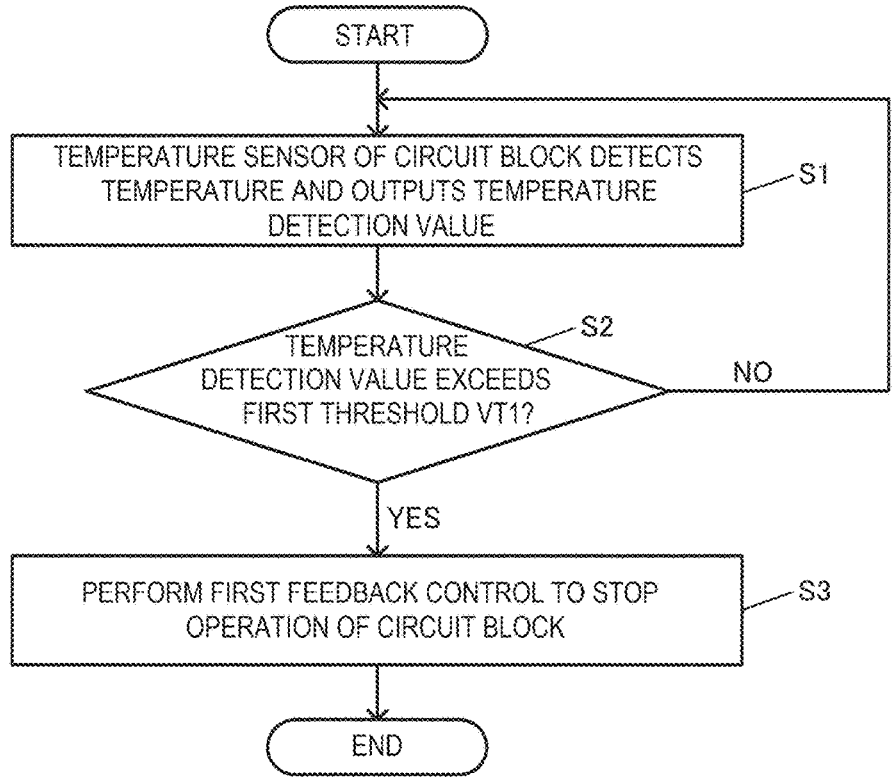
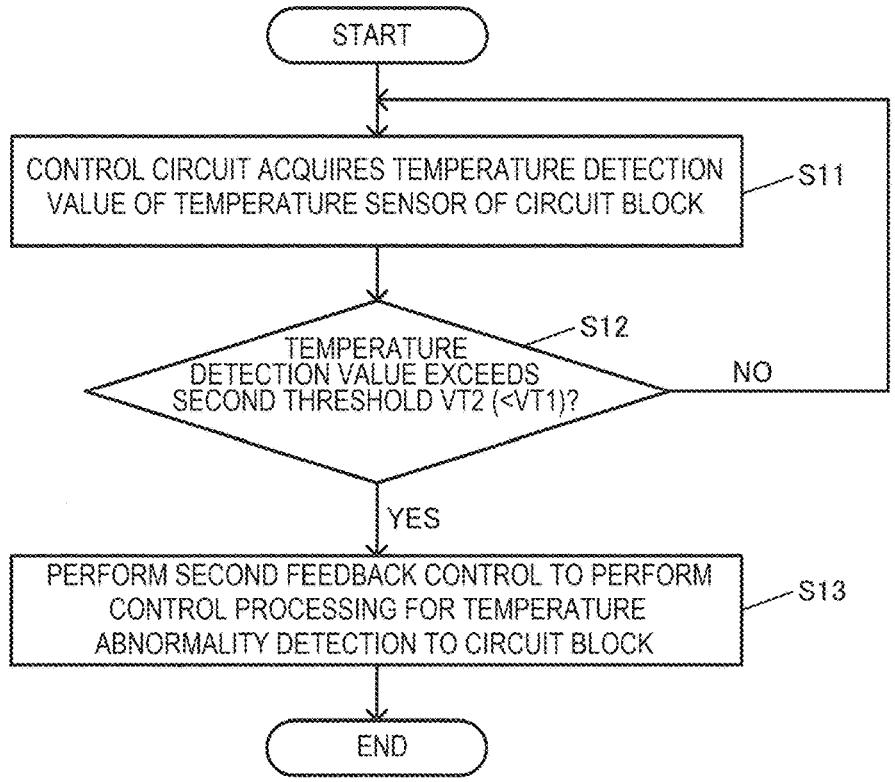

FIG. 8
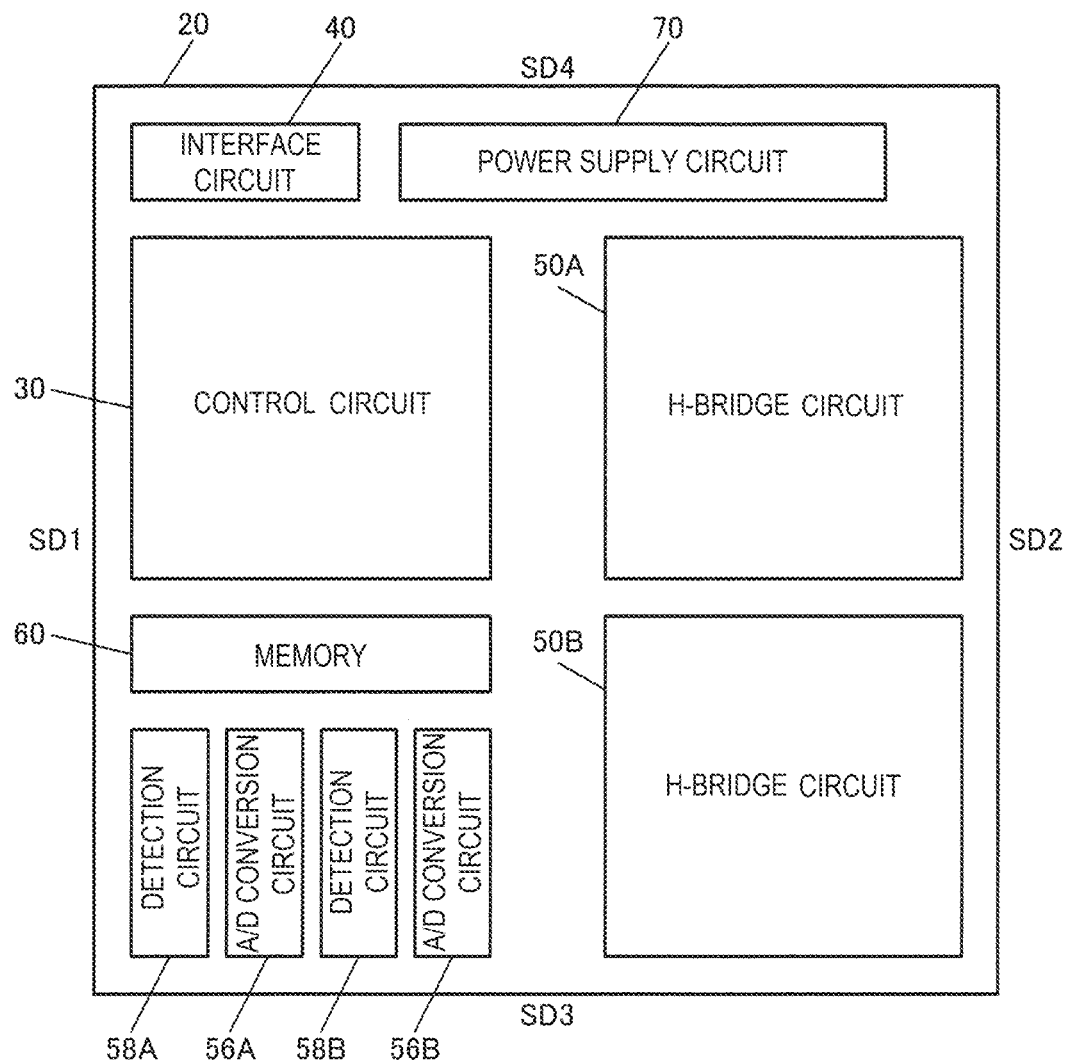
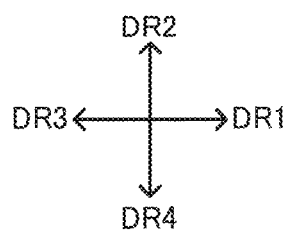

TEMPERATURE ABNORMALITY DETECTION CIRCUIT DEVICE

The present application is based on, and claims priority from JP Application Serial Number 2021-172193, filed Oct. 21, 2021, the disclosure of which is hereby incorporated by reference herein in its entirety.

BACKGROUND

1. Technical Field

The present disclosure relates to a circuit device and a processing system or the like.

2. Related Art

According to the related art, a circuit device made up of a plurality of circuit blocks is known. For example, according to JP-A-2019-12377, a temperature sensor is provided in each core, which is a circuit block, and the power consumed in each core is calculated. The power consumed is found according to the temperature of each core and a core to be controlled is selected according to the power consumed that is found.

However, according to JP-A-2019-12377, the circuit blocks are simply controlled individually, based on the result of temperature detection by the temperature sensor provided in each circuit block. Therefore, the control based on the result of temperature detection can only be optimized in each circuit block.

SUMMARY

An aspect of the present disclosure relates to a circuit device including: a plurality of circuit blocks, each circuit block being provided with at least one temperature sensor; and a control circuit controlling the plurality of circuit blocks. The each circuit block performs first feedback control for temperature abnormality detection, based on a temperature detection value of the temperature sensor provided in the each circuit block. The control circuit performs second feedback control for temperature abnormality detection to the each circuit block of the plurality of circuit blocks, based on the temperature detection value of the temperature sensor.

Another aspect of the present disclosure relates to a processing system including: the foregoing circuit device; and a processing device performing third feedback control.

BRIEF DESCRIPTION OF THE DRAWINGS

FIG. 2 is a flowchart for explaining an example of operation in the embodiment.

FIG. 3 is a flowchart for explaining an example of operation in the embodiment.

FIG. 8 shows an example of the layout in the circuit device.

DESCRIPTION OF EXEMPLARY EMBODIMENTS

An embodiment will now be described. The embodiment described below should not unduly limit the content of the description in the claims. Not all the configurations described in the embodiment are necessarily essential configurations.

1. Circuit Device

Figure 1:
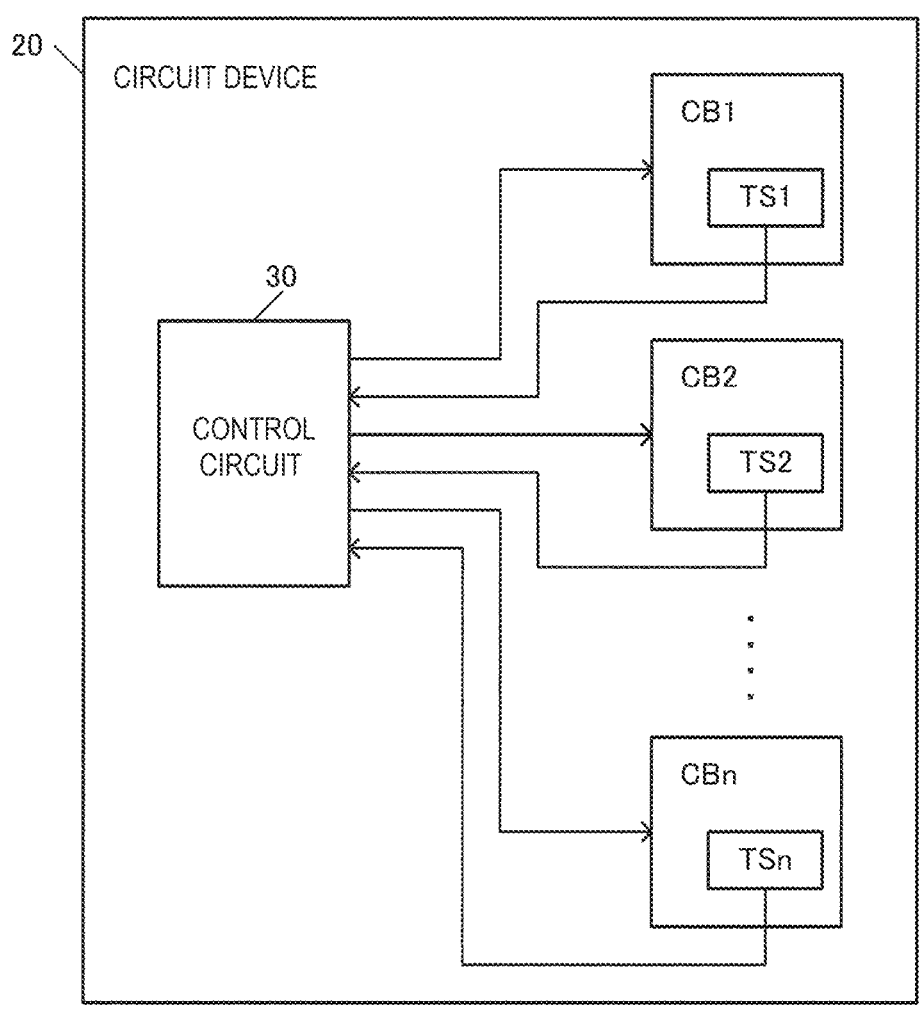
FIG. 1 shows an example of the configuration of a circuit device according to an embodiment.

FIG. 1 shows an example of the configuration of a circuit device 20 according to this embodiment. The circuit device 20 includes a plurality of circuit blocks CB1 to CBn, each circuit block being provided with at least one temperature sensor, and a control circuit 30 controlling the plurality of circuit blocks CB1 to CBn. For example, the circuit blocks CB1, CB2 . . . . CBn are provided with temperature sensors TS1, TS2 . . . . TSn, respectively. While FIG. 1 shows a case where one temperature sensor is provided in each of the circuit blocks CB1 to CBn, two or more temperature sensors may be provided in each circuit block. The circuit device 20 may have a circuit block that is not provided with a temperature sensor. In the description below, the temperature sensors TS1 to TSn are collectively referred to as the temperature sensor TS where appropriate and the circuit blocks CB1 to CBn are collectively referred to as the circuit block CB where appropriate.

The circuit device 20 is, for example, an IC (integrated circuit) produced by a semiconductor process and is a semiconductor chip having a circuit element formed at the top of a semiconductor substrate. The circuit block CB is a circuit compiled on a per-function basis in order to implement a predetermined function such as driving of an external load, supply of power, sensing, or signal conversion. The circuit block CB is, for example, a reusable functional block called IP core (intellectual property core). The circuit block CB is made up of a plurality of circuit elements. The circuit element is an active element such as a transistor or a passive element such as a capacitor. The circuit block CB is made up of, for example, a transistor such as a power MOSFET like a DMOS (double-diffused MOSFET). For example, the circuit block CB includes an analog circuit and can also include a digital circuit for control. In the circuit block CB, for example, the layout of the circuit element is fixed to some extent and, for example, the layout of a wiring such as a signal line is changeable. The circuit device 20 according to this embodiment is implemented, for example, by arranging a plurality of circuit blocks corresponding to a client's request. The plurality of circuit blocks forming the circuit device 20 can be reconfigured. The signal wiring coupling the circuit blocks to each other can be rearranged.

The temperature sensor TS is a sensor detecting temperature and outputting the result of the temperature detection. Specifically, the temperature sensor TS outputs a temperature-dependent voltage changing according to the ambient temperature, as a temperature detection value. For example, the temperature sensor TS generates the temperature detection value, using a temperature-dependent circuit element. Specifically, the temperature sensor TS uses the temperature dependence of the forward voltage of the P-N junction and thus outputs a temperature detection voltage having a voltage value that changes depending on the temperature, as the temperature detection value. As the forward voltage of the P-N junction, for example, the base-emitter voltage of a bipolar transistor or the like can be used. The temperature detection value may be an analog value such as the temperature detection voltage or may be digital data. Also, a modified implementation in which a digital temperature sensor is used as the temperature sensor TS can be employed.

The control circuit 30 performs various kinds of control processing. For example, the control circuit 30 controls the entirety of the circuit device 20 and also controls an operation sequence of the circuit device 20. Specifically, the control circuit 30 controls the circuit blocks CB1 to CBn. For example, the control circuit 30 outputs a control signal to the circuit blocks CB1 to CBn and thus controls the operation of each circuit block or performs various kinds of setting processing for each circuit block. The control circuit 30 is implemented by a logic circuit, for example. For example, the control circuit 30 can be implemented by an ASIC (application-specific integrated circuit) based on automatic placement and routing, such as a gate array.

In this embodiment, each circuit block of the plurality of circuit blocks CB1 to CBn performs first feedback control for temperature abnormality detection, based on the temperature detection value of the temperature sensor TS provided in each circuit block. Meanwhile, the control circuit 30 performs second feedback control for temperature abnormality detection to each circuit block of the plurality of circuit blocks CB1 to CBn, based on the temperature detection value of the temperature sensor TS. There may be a circuit block that does not perform the first feedback control. There may be a circuit block to which the second feedback control is not performed by the control circuit 30.

The first feedback control is feedback control within the circuit block CB, which is each of the circuit blocks CB1 to CBn. For example, when the circuit block CB has a functional circuit such as a drive circuit, a supply circuit, a sensing circuit or a conversion circuit, the first feedback control is to perform feedback control for temperature abnormality detection to the functional circuit in the circuit block CB, based on the temperature detection value of the temperature sensor TS provided in the circuit block CB. The first t feedback control for temperature abnormality detection is feedback control that is preset as feedback control to be performed within the circuit block CB when a temperature abnormality is detected. For example, this feedback control is to stop the operation of the functional circuit or set the functional circuit into a low power consumption mode, or the like. For example, the first feedback control is to perform feedback control to stop the operation of the functional circuit or set the functional circuit into the low power consumption mode, based on the temperature detection value. For example, when an overheat state is detected in the area of the circuit block CB by the temperature sensor TS, the first feedback control to stop the functional circuit in the circuit block CB or set the functional circuit into the low power consumption mode is performed.

The second feedback control is feedback control performed by the control circuit 30, based on the temperature detection value of the temperature sensor TS. For example, when the circuit block to be controlled is the circuit block CB1 shown in FIG. 1, the control circuit 30 performs the second feedback control for temperature abnormality detection to the circuit block CB1, based on the temperature detection value of at least the temperature sensor TS1 in the circuit block CB1. The control circuit 30 may also perform the second feedback control for temperature abnormality detection to the circuit block CB1, based on the temperature detection value of at least one of the temperature sensors TS2 to TSn of the other circuit blocks CB2 to CBn than the circuit block CB1 to be controlled. The second feedback control for temperature abnormality detection is feedback control that is preset as feedback control to be performed by the control circuit 30 when a temperature abnormality is detected. For example, this feedback control is to stop the operation of the functional circuit in the circuit block to be controlled or set the functional circuit into the low power consumption mode, or the like.

In this way, in this embodiment, both the first feedback control in each circuit block and the second feedback control by the control circuit 30 are performed as the feedback control based on the temperature detection value. Therefore, each feedback control loop of a plurality of feedback control loops can be provided separately for each hierarchical level and used properly according to need, such as the first feedback control in each circuit block, and the second feedback control by the control circuit 30, which is at a higher level. Also, for example, a short-term temperature change, such as when a transitional temperature abnormality is detected, can be dealt with, for example, by control processing for temperature abnormality detection based on the first feedback control in each circuit block. Meanwhile, a long-term temperature change or a predicted temperature change can be dealt with by control processing for temperature abnormality detection based on the second feedback control by the control circuit 30, which is at a higher level than the circuit block. Therefore, the feedback control loops can be used properly, based on the time scale. Thus, in the circuit device 20, where a plurality of circuit blocks can be reconfigured, power management that can comply with a safe operating area (SOA) of the transistor or the like in each circuit block can be implemented via the temperature sensor. This enables the implementation of the circuit device 20 in which the circuit block as an IP core including an analog circuit or the like can operate safely and with high performance, and thus can provide, for example, high-performance and safe power control for motor driving and quick charging or the like in an electronic device or an electric vehicle or the like.

FIGS. 2 and 3 are flowcharts for explaining an example of operation in this embodiment. As shown in FIG. 2, the temperature sensor in the circuit block detects temperature and outputs a temperature detection value (step S1). The temperature detection value is, for example, a temperature-dependent temperature detection voltage or the like. Next, the circuit block determines whether the temperature detection value exceeds a first threshold VT1 or not (step S2). This determination is performed, for example, by a predetermined circuit within the circuit block. The temperature detection value has a higher value as the temperature becomes higher, for example. When the temperature detection value exceeds the first threshold VT1, the circuit block performs the first feedback control to stop the operation of the circuit block (step S3). This first feedback control is performed by a predetermined circuit within the circuit block.

As shown in FIG. 3, the control circuit 30 acquires the temperature detection value of the temperature sensor in the circuit block (step S11). For example, when the temperature detection value is an analog temperature detection voltage, the control circuit 30 acquires data in a digital value converted from this temperature detection voltage, as the temperature detection value. The control circuit 30 then determines whether the temperature detection value exceeds a second threshold VT2 or not (step S12). The second threshold VT2 is a lower value than the first threshold VT1 in step S2 shown in FIG. 2. When the temperature detection value exceeds the second threshold VT2, the control circuit 30 performs the second feedback control to perform control processing for temperature abnormality detection to the circuit block (step S13).

In this way, in this embodiment, as the first feedback control, each circuit block performs feedback control to stop the operation of each circuit block as shown in step S3 when the temperature detection value of the temperature sensor provided in each circuit block exceeds the first threshold VT1 in step S2 shown in FIG. 2. Meanwhile, as the second feedback control, the control circuit 30 performs feedback control to perform control processing for temperature abnormality detection to each circuit block as shown in step S13 when the temperature detection value exceeds the second threshold VT2 lower than the first threshold VT1 in step S12 shown in FIG. 3.

For example, when the temperature detection value exceeds the first threshold VT1 and a temperature exceeding the safe operating area of the transistor in the circuit block is detected, the operation of the circuit block is stopped by the first feedback control in the circuit block. Stopping the operation of the circuit block is, for example, stopping the operation of a predetermined functional circuit such as a drive circuit or a power supply circuit in the circuit block. In this way, when a temperature abnormality exceeding the safe operating area (SOA) is detected, the operation of the circuit block can be swiftly stopped by the first feedback control, and the transistor or the like in the circuit block can be effectively prevented from breaking down.

Meanwhile, when the temperature detection value exceeds the second threshold VT2 lower than the first threshold VT1, processing control for temperature abnormality detection is performed to the circuit block to be controlled, by the second feedback control by the control circuit 30, which is at a higher level. That is, when it is detected that a second temperature corresponding to the second threshold VT2, which is lower than a first temperature corresponding to the first threshold VT1, is exceeded, the second feedback control by the control circuit 30 is performed instead of the first feedback control in the circuit block. Thus, control processing for temperature abnormality detection by the control circuit 30, which is at a higher level than the circuit block, can be executed before the temperature in the circuit block reaches the first temperature corresponding to the first threshold VT1. For example, control processing for temperature abnormality detection such that the temperature in the circuit block does not reach the first temperature can be executed under the control of the control circuit 30. For example, the control circuit 30 also acquires temperature detection values from the other circuit blocks than the circuit block to be controlled, and therefore can perform control processing for temperature abnormality detection that reflects the results of the temperature detection in the other circuit blocks, to the circuit block to be controlled.

When the temperature detection value exceeds the second threshold VT2, the control circuit 30 performs, for example, control processing for temperature abnormality detection to stop the operation of each circuit block or set each circuit block into the low power consumption mode. For example, when the temperature detection value of the temperature sensor in the circuit block to be controlled exceeds the second threshold VT2, control processing for temperature abnormality detection to stop the operation of the circuit block or set the circuit block into the low power consumption mode, in which the power consumed is lower than in the normal mode, is executed. Thus, the operation of the circuit block is stopped or the circuit block is set into the low power consumption mode and the temperature in the circuit block can thus be controlled not to rise, before the temperature in the circuit block reaches the first temperature corresponding to the first threshold VT1. Also, the control circuit 30 can execute control processing for temperature abnormality detection to stop the operation of the circuit block to be controlled or set the circuit block into the low power consumption mode, reflecting the results of the temperature detection in the other circuit blocks than the circuit block to be controlled.

Figure 4:
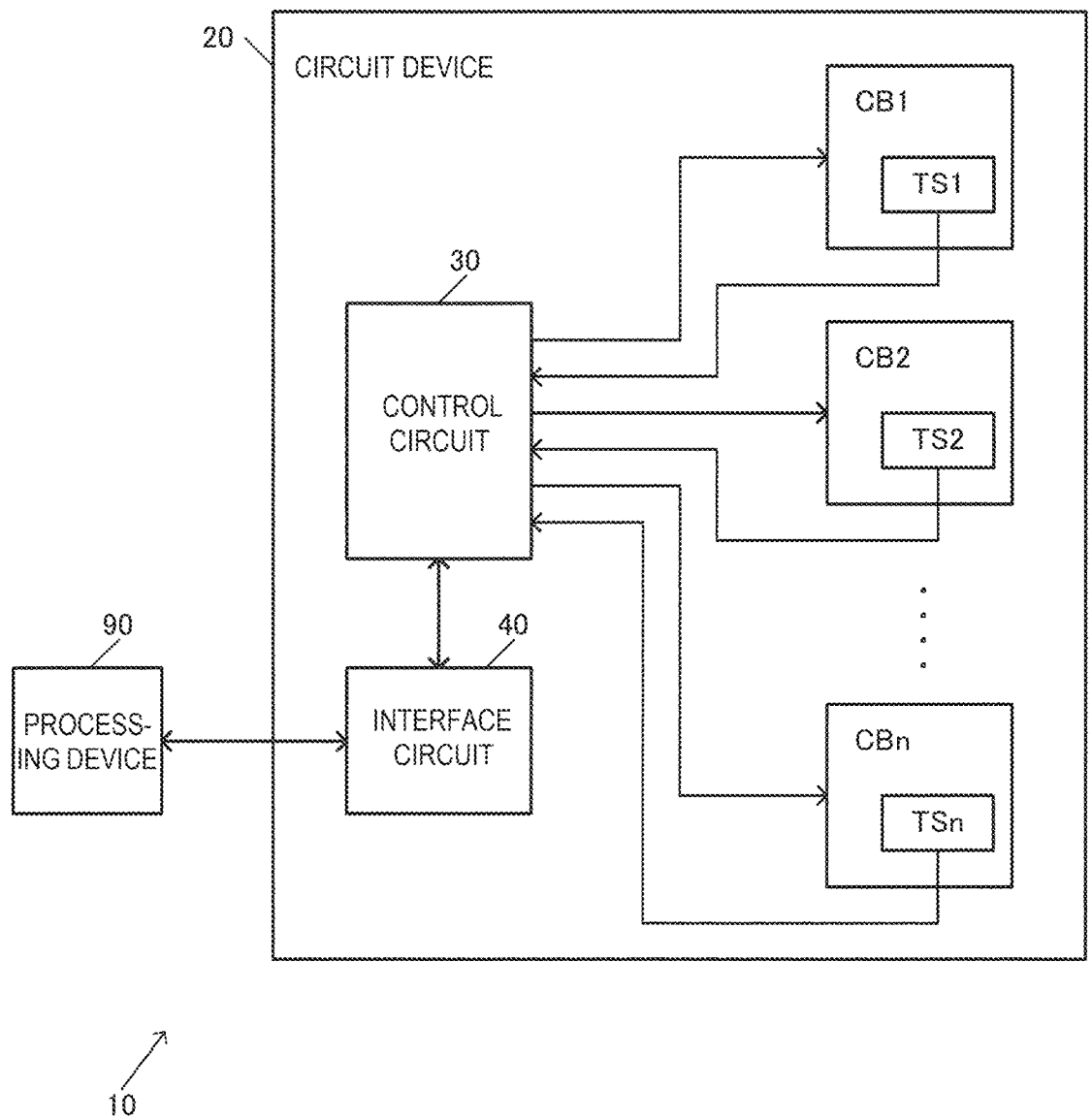
FIG. 4 shows a detailed example of the configuration of the circuit device and a processing system according to the embodiment.

FIG. 4 shows a detailed example of the configuration of the circuit device 20 according to the embodiment and a processing system 10 including the circuit device 20. In FIG. 4, the circuit device 20 includes an interface circuit 40 in addition to the components shown in FIG. 1. The processing system 10 includes the circuit device 20 according to the embodiment and a processing device 90 performing third feedback control.

The processing device 90 is a device provided outside the circuit device 20 and performing various kinds of processing in the processing system 10. The processing device 90 can be implemented, for example, by a processor such as a microcomputer, an MPU, or a CPU. For example, when the processing system 10 is a system incorporated in an automobile such as an electric vehicle, the processing device 90 is an ECU (electronic control unit), for example. Alternatively, the processing device 90 may be a device implemented by an ASIC.

The interface circuit 40 is a circuit serving as an interface with an external device and is a circuit for communicating with the external processing device 90, for example. For example, the temperature detection values of the temperature sensors TS1 to TSn in the circuit blocks CB1 to CBn in the circuit device 20 are transmitted to the external processing device 90 via the interface circuit 40. Also, instruction information for the third feedback control is received from the processing device 90 via the interface circuit 40. The interface circuit 40 can be implemented, for example, by a serial interface circuit performing serial interface communication. For example, the interface circuit 40 can be implemented by a serial interface circuit such as an SPI (serial peripheral interface) or an I2C (inter-integrated circuit). The SPI or the I2C performs serial interface communication using a serial clock signal and a serial data signal. Also, a parallel interface circuit performing parallel interface communication may be used as the interface circuit 40.

In FIG. 4, the interface circuit 40 performs notification processing about the temperature detection value of the temperature sensor to the processing device 90 in order to cause the processing device 90 to perform the third feedback control for temperature abnormality detection. For example, the processing device 90 performs the third feedback control for temperature abnormality detection based on the temperature detection values of the temperature sensors TS1 to TSn in the circuit blocks CB1 to CBn in the circuit device 20. In this case, the interface circuit 40 performs notification processing about the temperature detection values that is necessary for causing the processing device 90 to perform the third feedback control. The notification processing is notification processing to cause the processing device 90 to perform the third feedback control. For example, the notification processing may be notification processing in which the circuit device 20 detects a temperature abnormality and in which the interface circuit 40 notifies the processing device 90 that a temperature abnormality is detected, or may be notification processing in which the interface circuit 40 outputs a temperature detection value for detecting a temperature abnormality to the processing device 90. As the interface circuit 40 performs such notification processing, the external processing device 90 can execute the third feedback control based on the temperature detection value, based on the information acquired by this notification processing. Thus, the third feedback control for temperature abnormality detection by the processing device 90, which is at a higher level than the control circuit 30, can be implemented.

Figure 5:
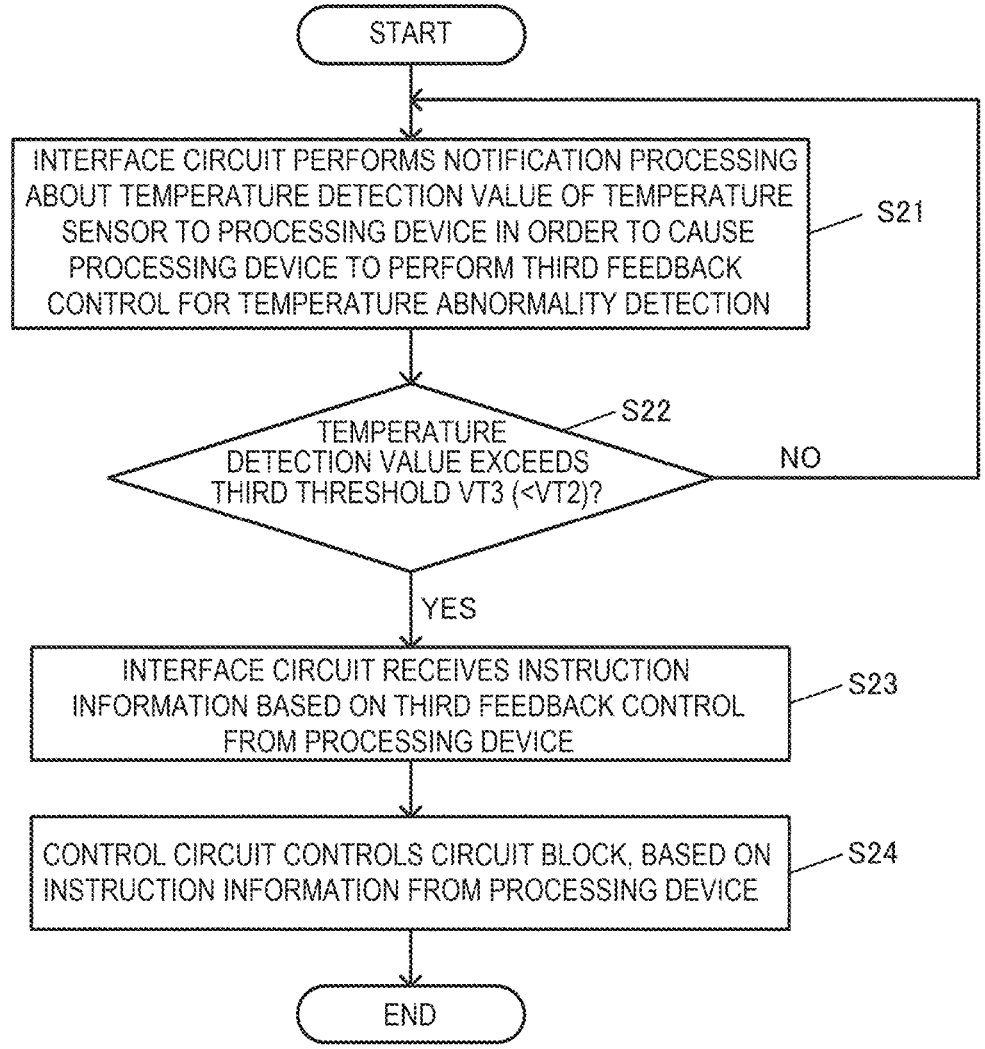
FIG. 5 is a flowchart for explaining an example of operation in the embodiment.

FIG. 5 is a flowchart for explaining an example of operation in the embodiment using the configuration shown in FIG. 4. First, the interface circuit 40 performs the notification processing about the temperature detection value of the temperature sensor to the processing device 90 in order to cause the processing device 90 to perform the third feedback control for temperature abnormality detection (step S21). For example, the interface circuit 40 performs processing to notify that a temperature abnormality is detected, or notification processing about the temperature detection value itself. When the temperature detection value exceeds a third threshold VT3 (<VT2) (step S22), the interface circuit 40 receives instruction information based on the third feedback control from the processing device 90 (step S23). For example, the interface circuit 40 receives instruction information for performing the third feedback control from the processing device 90. Then, the control circuit 30 controls the circuit block, based on the instruction information from the processing device 90 (step S24). That is, the control circuit 30 performs control processing for the third feedback control by the processing device 90, to the circuit block.

In this way, in this embodiment, the control circuit 30 receives the instruction information based on the third feedback control from the processing device 90 via the interface circuit 40 and controls each circuit block, as shown in steps S23 and S24 in FIG. 5. For example, the processing device 90 receives the notification processing about the temperature detection value of the temperature sensor via the interface circuit 40, as described above. Then, the processing device 90 having received the notification processing transmits the instruction information for performing the third feedback control based on the temperature detection value. The control circuit 30 receives the instruction information via the interface circuit 40. As the control circuit 30 controls the circuit block to be controlled, based on the instruction information from the processing device 90, the third feedback control by the processing device 90 is implemented. In this way, as the processing device 90 having received the notification processing transmits the instruction information to the circuit device 20, the third feedback control by the processing device 90 corresponding to the notification processing about the temperature detection value can be implemented by the control of the circuit block by the control circuit 30, using the instruction information from the processing device 90.

Also, in this embodiment, as the first feedback control, each circuit block in the circuit device 20 performs the feedback control to stop the operation of each circuit block when the temperature detection value of the temperature sensor provided in each circuit block exceeds the first threshold VT1, as described with reference to FIG. 2. As the second feedback control, the control circuit 30 performs the feedback control to perform the control processing for temperature abnormality detection to each circuit block when the temperature detection value exceeds the second threshold VT2 lower than the first threshold VT1, as described with reference to FIG. 3. Then, as the notification processing, the interface circuit 40 performs the notification processing to cause the processing device 90 to perform the third feedback control when the temperature detection value exceeds the third threshold VT3 lower than the second threshold VT2, as described with reference to FIG. 5.

In this way, when the temperature detection value exceeds the first threshold VT1 and a temperature exceeding the safe operating area of the transistor or the like in the circuit block is detected, the operation of the circuit block stops as the first feedback control is performed. Meanwhile, when the temperature detection value exceeds the second threshold VT2 lower than the first threshold VT1, the control processing for temperature abnormality detection is performed to the circuit block to be controlled, as the second feedback control is performed by the control circuit 30, which is at a higher level than the circuit block. When the temperature detection value exceeds the third threshold VT3 lower than the second threshold VT2, the notification processing to cause the processing device 90 to perform the third feedback control when the temperature detection value exceeds the third threshold VT3 is performed, and the third feedback control by the processing device 90 is thus implemented. Thus, whether the temperature detection value exceeds the first threshold VT1, the second threshold VT2, and the third threshold VT3 or not is determined and the feedback control by the circuit block, the control circuit 30, and the processing device 90 of the corresponding hierarchical levels can be implemented.

2. Detailed Example of Configuration

A detailed example of the configuration in this embodiment will now be described. Specifically, a detailed example in a case where one of the circuit blocks in the circuit device 20 is an H-bridge circuit will be described.

Figure 6:
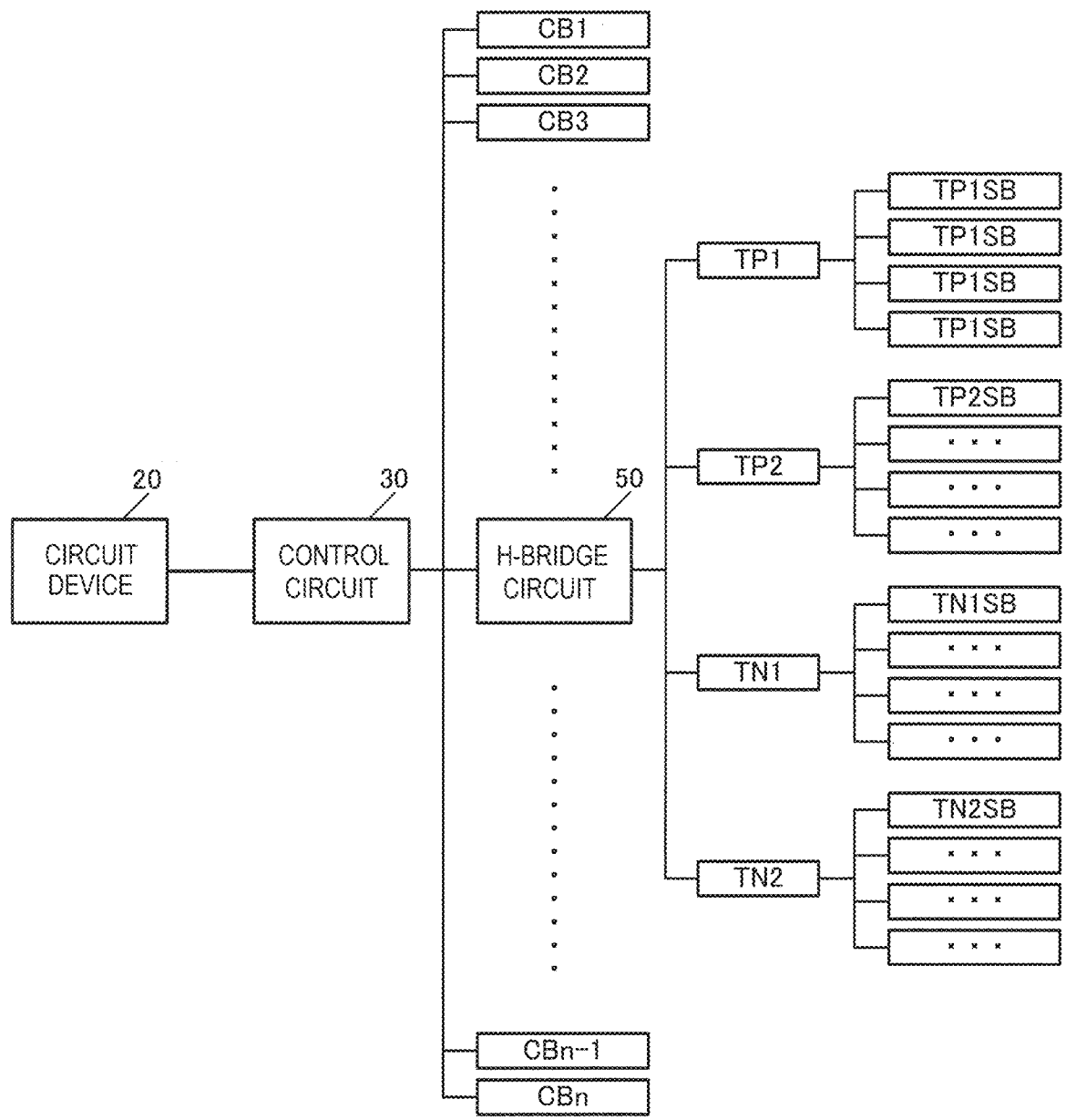
FIG. 6 is an explanatory view showing the hierarchical structure of the circuit device.

FIG. 6 is an explanatory view of the hierarchical structure of the circuit device 20. As shown in FIG. 6, in connection with the circuit device 20, the circuit blocks CB1 to CBn such as an H-bridge circuit 50 shown in FIG. 7 described later are arranged at a level below the control circuit 30, and the H-bridge circuit 50 is made up of P-type drive transistors TP1, TP2 and N-type drive transistors TN1, TN2. The drive transistors TP1, TP2, TN1, TN2 are made up of unit transistors TP1SB, TP2SB, TN1SB, TN2SB, respectively.

Figure 7:
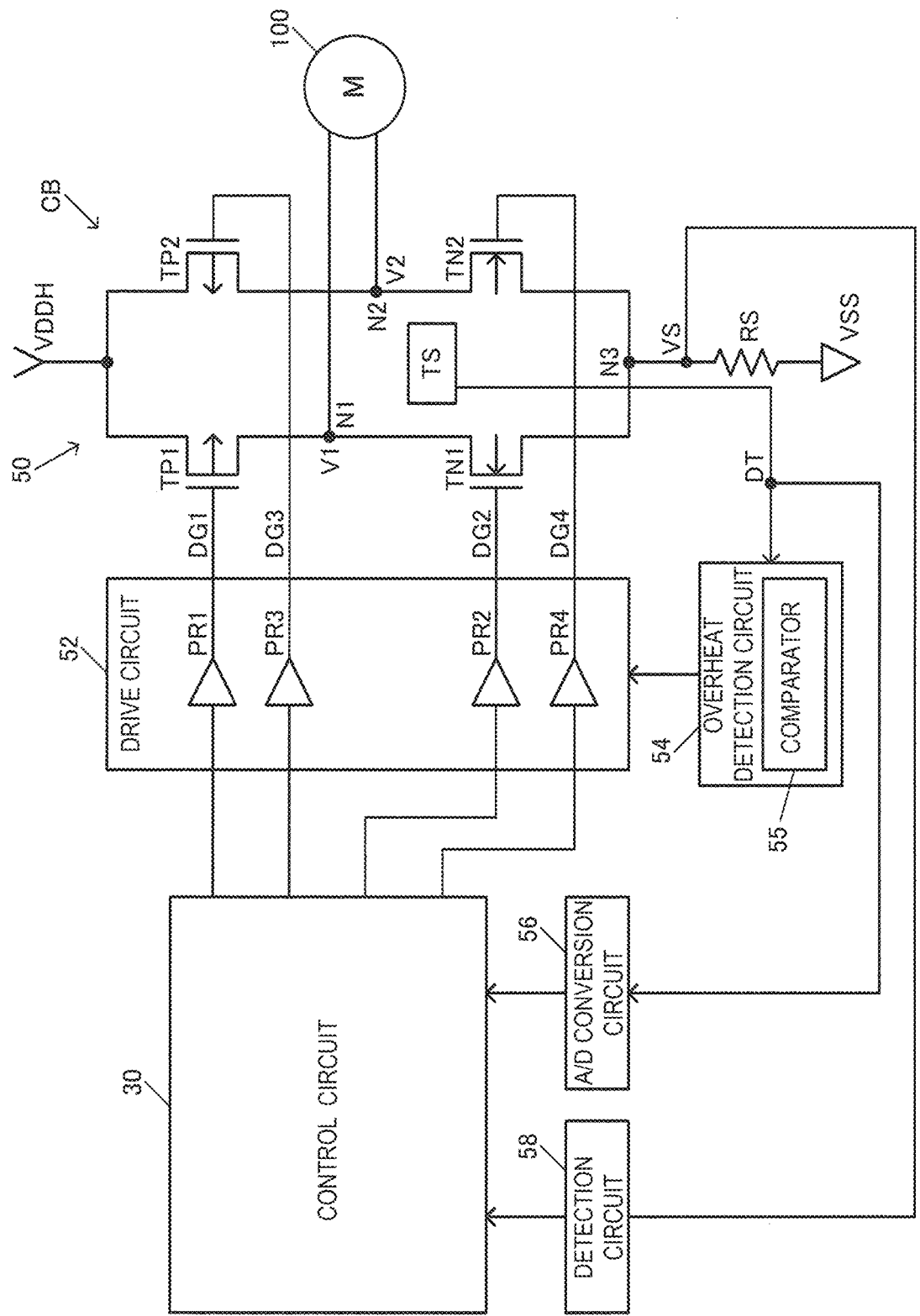
FIG. 7 shows an example of the configuration of an H-bridge circuit, which is an example of a circuit block.

FIG. 7 shows an example of the configuration of the H-bridge circuit 50, which is a circuit block CB. The H-bridge circuit 50 is a circuit outputting a drive current to a motor 100 to be driven, and includes the drive transistors TP1, TP2 on the high side and the drive transistors TN1, TN2 on the low side. The P-type drive transistors TP1, TP2 and the N-type drive transistors TN1, TN2 are, for example, power MOSFETs such as DMOSs (double-diffused MOSFETs) and are high-withstand-voltage transistors. The drive transistors TP1, TN1 are provided in series between a VDDH power supply node and a sensing resistor RS. The drive transistors TP2, TN2 are provided in parallel with the drive transistors TP1, TN1 and in series between the VDDH power supply node and the sensing resistor RS. A voltage V1 at a node N1 between the drive transistor TP1 and the drive transistor TN1 and a voltage V2 at a node N2 between the drive transistor TP2 and the drive transistor TN2 are outputted to the motor 100.

The sensing resistor RS is provided between a node N3, which is the source node of the drive transistors TN1, TN2, and a VSS node. A voltage VS at a node at one end of the sensing resistor RS is inputted to a detection circuit 58. The detection circuit 58 is a circuit detecting a current flowing through the H-bridge circuit 50. The detection circuit 58 detects the voltage VS at the one end of the sensing resistor RS and thus detects a charge current during a charge period. In the H-bridge circuit 50, for example, the drive transistors TP1, TN2 are on during the charge period. Thus, a charge current flows from VDDH, which is a high-potential power supply, to VSS, which is low-potential power supply, via the drive transistor TP1, the motor 100, and the drive transistor TN2. Meanwhile, during a decay period, for example, the drive transistors TP2, TN1 are on and a decay current flows from VSS to VDDH via the drive transistor TN1, the motor 100, and the drive transistor TP2. Both the charge current and the decay current flow from a positive-electrode terminal to a negative-electrode terminal of the motor 100.

A drive circuit 52 includes pre-drivers PR1, PR2, PR3, PR4. The pre-drivers PR1, PR2, PR3, PR4 output drive signals DG1, DG2, DG3, DG4 to the gates of the drive transistors TP1, TN1, TP2, TN2 of the H-bridge circuit 50, respectively. For example, the control circuit 30 outputs a PWM control signal to the pre-drivers PR1, PR2, PR3, PR4 of the drive circuit 52, based on the result of the detection of the voltage VS by the detection circuit 58, and thus causes the pre-drivers PR1, PR2, PR3, PR4 to drive the H-bridge circuit 50. For example, the control circuit 30 controls a chopping operation of maintaining a chopping current flowing through the H-bridge circuit 50 at a constant level. Specifically, the control circuit 30 controls the pulse width of the PWM control signal so as to make the chopping current constant, and the drive transistors TP1, TP2, TN1, TN2 are on-off controlled, based on the PWM control signal.

Figure 9:
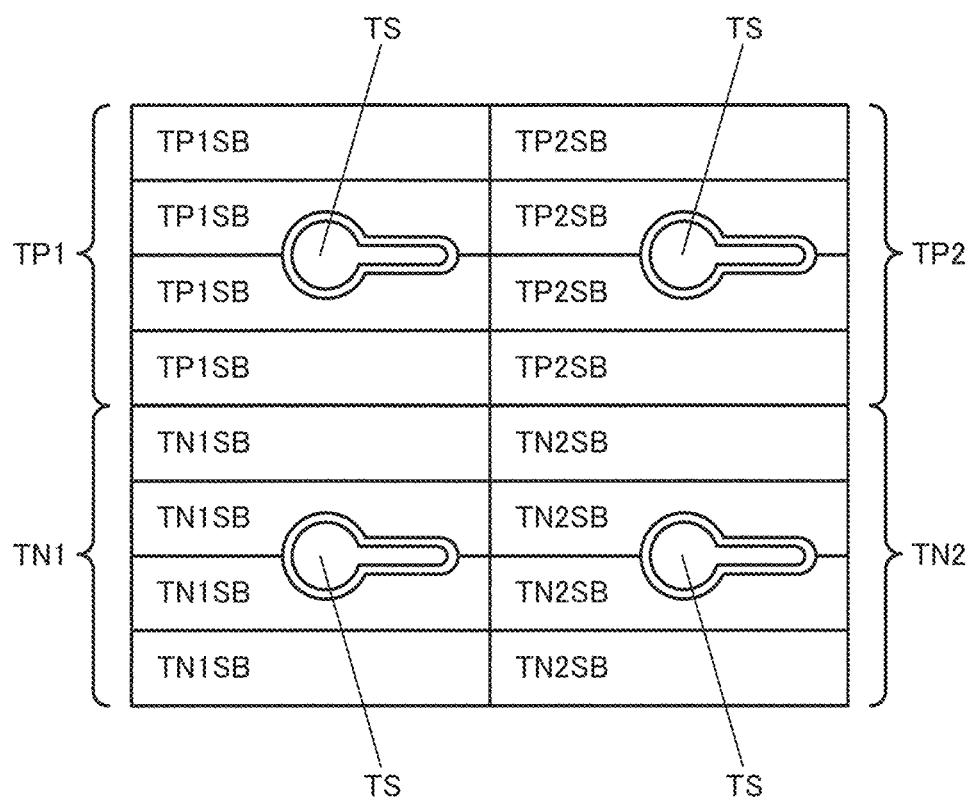
FIG. 9 shows an example of the layout of a drive transistor and a temperature sensor in the H-bridge circuit.

In FIG. 7, the circuit block CB of the H-bridge circuit 50 is provided with a temperature sensor TS and an overheat detection circuit 54. It is desirable that the temperature sensor TS is provided for each drive transistor of the H-bridge circuit 50, as shown in FIG. 9 described later. In FIG. 7, a temperature detection value DT of the temperature sensor TS is inputted to the overheat detection circuit 54. When the overheat detection circuit 54 has detected that it is an overheat state, based on the temperature detection value DT, the overheat detection circuit 54 performs, for example, the first feedback control to output a signal to stop the operation of the H-bridge circuit 50 to the drive circuit 52. For example, the drive signals DG1, DG3 from the drive circuit 52 are turned to high level and the drive signals DG2, DG4 are turned to low level, so as to turn off the drive transistors TP1, TP2, TN1, TN2. Thus, the operation of the H-bridge circuit 50 can be stopped. Specifically, the overheat detection circuit 54 has a comparator 55, and the comparator 55 compares the temperature detection value DT from the temperature sensor TS with the first threshold VT1 described with reference to FIG. 2. When the overheat detection circuit 54 has detected that the temperature detection value DT exceeds the first threshold VT1, the overheat detection circuit 54 performs the first feedback control to output a signal to stop the operation of the H-bridge circuit 50 to the drive circuit 52.

The temperature detection value DT of the temperature sensor TS is also inputted to an A/D conversion circuit 56. The A/D conversion circuit 56 outputs data acquired by A/D-converting the temperature detection value DT, to the control circuit 30. When the control circuit 30 has detected that the temperature detection value DT exceeds the second threshold VT2 described with reference to FIG. 3, the control circuit 30 performs the second feedback control to stop the operation of the H-bridge circuit 50 or set the H-bridge circuit 50 into the low power consumption mode. The operation of the H-bridge circuit 50 can be stopped by the control circuit 30 outputting a PWM control signal to turn off the transistors TP1, TP2, TN1, TN2, to the drive circuit 52. The low power consumption mode can be set, for example, by the control circuit 30 outputting a PWM control signal set to a duty ratio for the low power consumption mode, to the drive circuit 52, or the like.

FIG. 8 shows an example of the layout in the circuit device 20. FIG. 8 shows the layout of each circuit block as viewed in a plan view along a direction orthogonal to the semiconductor substrate of the circuit device 20. In FIG. 8, a direction from a side SD1 of the circuit device 20 to an opposite side SD2 is referred to as DR1. A direction from a side SD3 to an opposite side SD4 is referred to as DR2. A direction opposite to DR1 is referred to as DR3. A direction opposite to DR2 is referred to as DR4.

As shown in FIG. 8, two H-bridge circuits 50A, 50B are provided in the circuit device 20. These two H-bridge circuits 50A, 50B enable the driving of two motors. The H-bridge circuit 50A and the H-bridge circuit 50B are arranged along the direction DR2 on the direction DR1 side of the control circuit 30, which is a logic circuit. A memory 60 is arranged on the direction DR4 side of the control circuit 30. The memory 60 stores necessary information for the operation of the circuit device 20 and information about the temperature detection value acquired by the temperature sensor, or the like. The memory 60 can be implemented, for example, by a RAM, a non-volatile memory, or the like. On the direction DR4 side of the memory 60, a detection circuit 58A and an A/D conversion circuit 56A provided corresponding to the H-bridge circuit 50A and a detection circuit 58B and an A/D conversion circuit 56B provided corresponding to the H-bridge circuit 50B are arranged. On the direction DR2 side of the control circuit 30, a power supply circuit 70 and the interface circuit 40 are arranged. The power supply circuit 70 generates various power-supply voltages used in the circuit device 20 and supplies the power-supply voltages to each circuit block in the circuit device 20.

FIG. 9 shows an example of the layout of the drive transistors TP1, TP2, TN1, TN2 and the temperature sensor TS in the H-bridge circuit. As described with reference to FIG. 6, the drive transistors TP1, TP2, TN1, TN2 are made up respectively of a plurality of unit transistors TP1SB, TP2SB, TN1SB, TN2SB coupled in parallel. In FIG. 9, the temperature sensor TS is arranged in each of the areas where the drive transistors TP1, TP2, TN1, TN2 are arranged. A total of four temperature sensors TS are arranged. Thus, the temperature in each of the drive transistors TP1, TP2, TN1, TN2 can be detected more accurately. For example, in FIG. 9, the temperature sensor TS is arranged near the center of the areas where the drive transistors TP1, TP2, TN1, TN2 are arranged, which is the heat generation center. Therefore, the heat generation in the channel area of each of the transistors can be detected more accurately.

Figure 10:
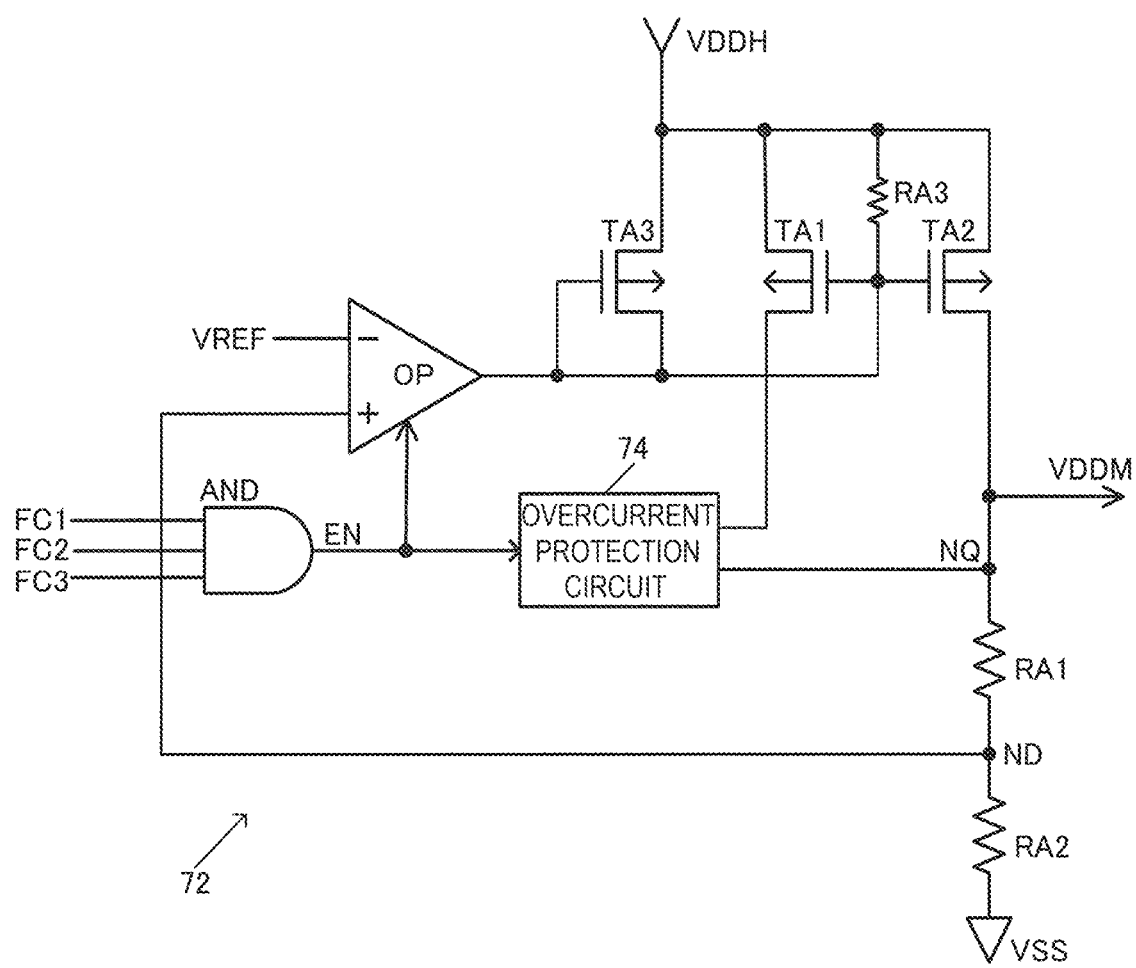
FIG. 10 shows an example of the configuration of a regulator, which is an example of the circuit block.

FIG. 10 shows an example of the configuration of a regulator 72, which is an example of the circuit block in the circuit device 20. The regulator 72, referred to as LOD (low dropout), is provided in the power supply circuit 70 shown in FIG. 8, for example. In FIG. 10, an output of an operational amplifier OP is inputted to the gate of drive transistors TA1, TA2. Between a VDDH node and the output node of the operational amplifier OP, a transistor TA3 having a gate and a drain coupled there is provided. Between the VDDH node and the gate node of the drive transistors TA1, TA2, a pull-up resistor RA3 is provided. Between an output node NQ of the regulator 72 and a VSS node, resistors RA1, RA2 are provided in series. A voltage at a division node ND between the resistors RA1, RA2 is inputted to the non-inverting input terminal of the operational amplifier OP. A reference voltage VREF is inputted to the inverting input terminal of the operational amplifier OP. Thus, a regulated power-supply voltage VDDM={(RA1+RA2)/RA2}×VREF is outputted to the output node NQ.

Also, in FIG. 10, an AND circuit AND to which control signals FC1, FC2, FC3 for feedback are inputted and an overcurrent protection circuit 74 are provided. When one of the control signals FC1, FC2, FC3 turns to inactive level, which is low level, and an enable signal EN, which is an output from the AND circuit AND, turns to inactive level, the operational amplifier OP then turns into an operation-disabled state and the overcurrent protection circuit 74 shuts off the coupling between the drain node of the drive transistor TA1 and the output node NQ of VDDM. Thus, the operation of the regulator 72 can be stopped. At this point, the output node of the operational amplifier OP is pulled up by the resistor RA3 and the drive transistor TA2 thus turns off.

The control signal FC1 inputted to the AND circuit AND is a signal for the first feedback control. For example, the regulator 72 is provided with a temperature sensor, not illustrated in FIG. 10. When the temperature detection value of this temperature sensor exceeds the first threshold VT1 described with reference to FIG. 2, the control signal FC1 turns to inactive level and the enable signal EN turns to inactive level, thus implementing the first feedback control based on the temperature detection value. The control signal FC2 is a signal for the second feedback control. For example, when the temperature detection value of the temperature sensor exceeds the second threshold VT2 described with reference to FIG. 3, the control signal FC2 turns to inactive level and the enable signal EN turns to inactive level, thus implementing the second feedback control based on the temperature detection value. The control signal FC3 is a signal for the third feedback control. For example, when the temperature detection value of the temperature sensor exceeds the third threshold VT3 described with reference to FIG. 5, the control signal FC3 turns to inactive level and the enable signal EN turns to inactive level, thus implementing the third feedback control based on the temperature detection value.

Figure 11:
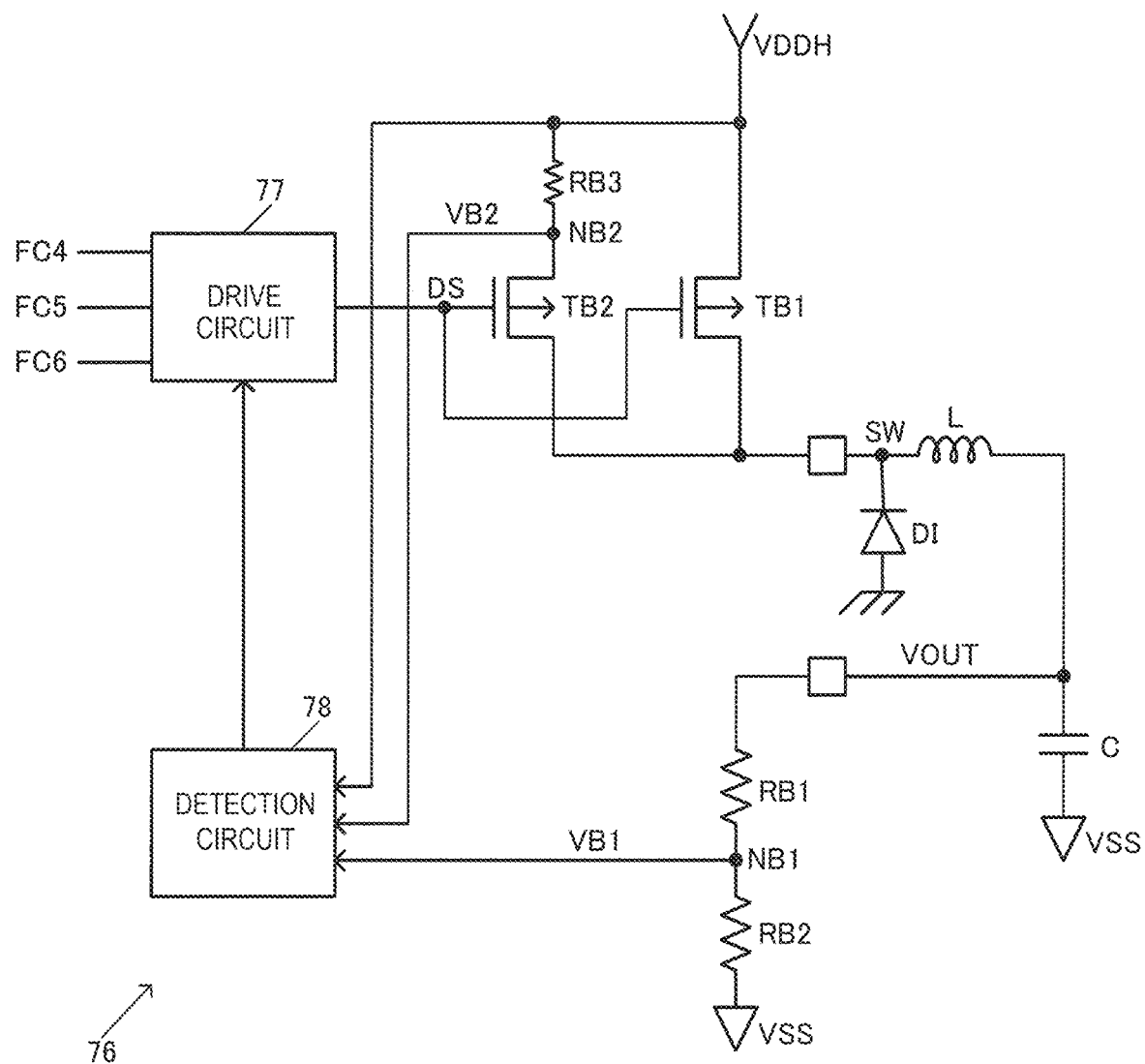
FIG. 11 shows an example of the configuration of a DC/DC converter, which is an example of the circuit block.

FIG. 11 shows an example of the configuration of a DC/DC converter 76, which is an example of the circuit block in the circuit device 20. The DC/DC converter 76 is provided in the power supply circuit 70 shown in FIG. 8, for example. In FIG. 11, the DC/DC converter 76 performs a switching regulation operation to drive a coil L, which is an external component of the circuit device 20, via drive transistors TB1, TB2 controlled by a drive signal DS from a drive circuit 77, and thus generates a power-supply voltage VOUT. In FIG. 11, a diode DI and a capacitor C for the switching regulation operation are also provided as external components at an SW node, which is the drain node of the drive transistors TB1, TB2. Between the output node of the power-supply voltage VOUT and a VSS node, resistors RB1, RB2 are provided in series. Between a VDDH node and the source of the drive transistor TB2, a resistor RB3 is provided. A voltage VB1 at a node NB1 between the resistor RB1 and the resistor RB2, a voltage VB2 at one end of the resistor RB3, and VDDH, are inputted to a detection circuit 78. The drive circuit 77 outputs the drive signal DS to the drive transistors TB1, TB2, based on the result of detection by the detection circuit 78. Thus, the switching regulation operation is performed and the power-supply voltage VOUT is generated.

Control signals FC4, FC5, FC6 for feedback control are inputted to the drive circuit 77. The control signal FC4 is a signal for the first feedback control. For example, the DC/DC converter 76 is provided with a temperature sensor, not illustrated in FIG. 11. When the temperature detection value of this temperature sensor exceeds the first threshold VT1 described with reference to FIG. 2, the control signal FC4 turns to inactive level and the drive signal DS turns to inactive level, thus implementing the first feedback control based on the temperature detection value. The control signal FC5 is a signal for the second feedback control. For example, when the temperature detection value of the temperature sensor exceeds the second threshold VT2 described with reference to FIG. 3, the control signal FC5 turns to inactive level and the drive signal DS turns to inactive level, thus implementing the second feedback control based on the temperature detection value. The control signal FC6 is a signal for the third feedback control. For example, when the temperature detection value of the temperature sensor exceeds the third threshold VT3 described with reference to FIG. 5, the control signal FC6 turns to inactive level and the drive signal DS turns to inactive level, thus implementing the third feedback control based on the temperature detection value.

Figure 12:
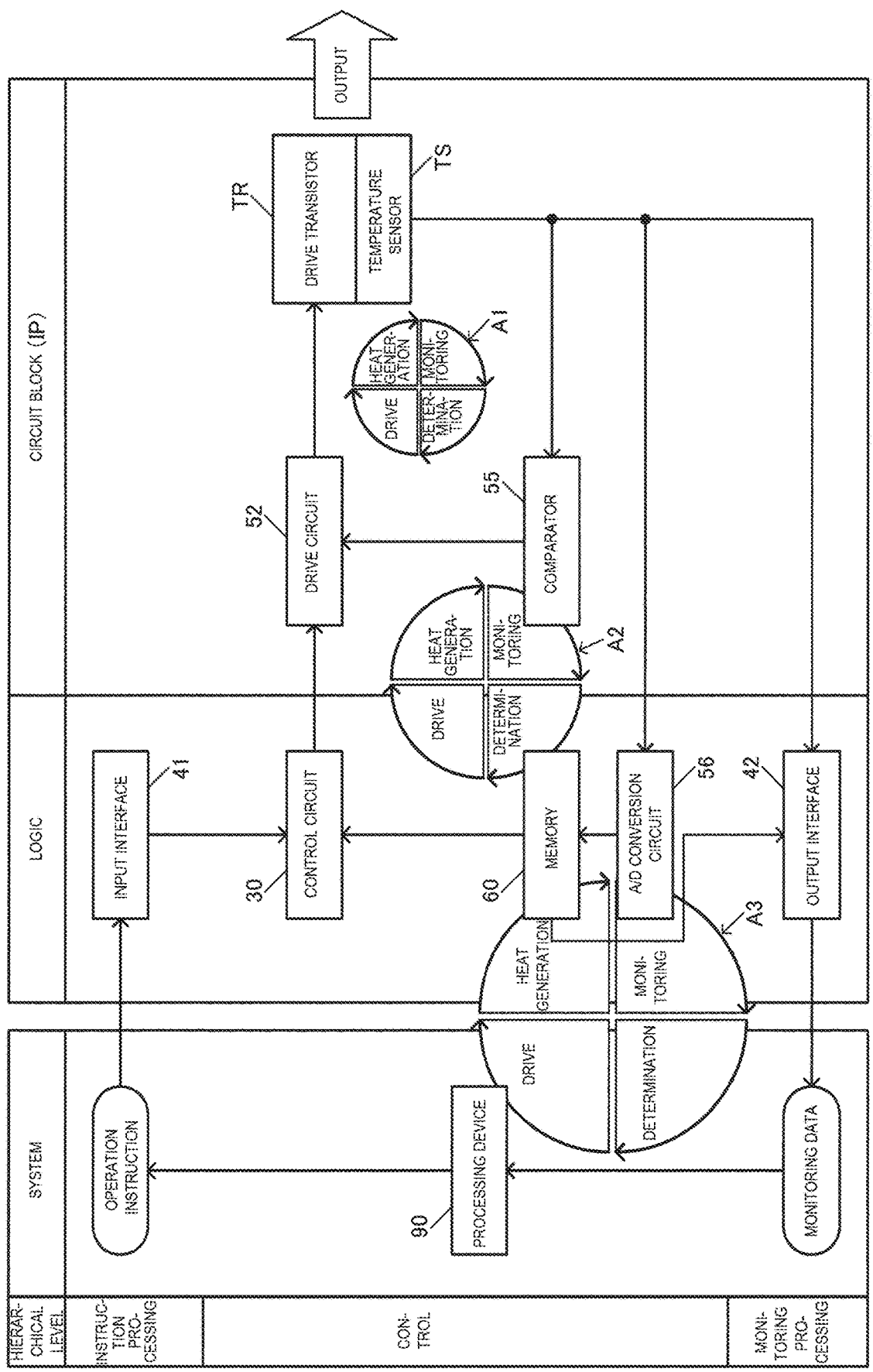
FIG. 12 is an explanatory view showing a feedback control loop at each hierarchical level.

FIG. 12 is an explanatory view showing the feedback control loop at each hierarchical level and specifically an explanatory view of the first feedback control, the second feedback control, and the third feedback control. In FIG. 12, an input interface 41 and an output interface 42 are provided in the interface circuit 40 shown in FIG. 4. A drive transistor TR corresponds to, for example, the drive transistors TP1, TP2, TN1, TN2 shown in FIG. 7. The comparator 55 is the comparator provided in the overheat detection circuit 54 shown in FIG. 7.

In the circuit block, the drive circuit 52 drives the drive transistor TR, and the temperature sensor TS provided corresponding to the drive transistor TR detects temperature and outputs a temperature detection value. The comparator 55 detects whether the temperature detection value exceeds the first threshold VT1 or not, as described with reference to FIG. 2. When the temperature detection value exceeds the first threshold VT1, the comparator 55 outputs, for example, a signal giving an instruction to stop driving the drive transistor TR to the drive circuit 52. Thus, when the temperature detection value exceeds the first threshold VT1, the driving of an external load by the drive transistor TR stops.

In this way, in the circuit block, a loop of the first feedback control of monitoring the heat generation of the drive transistor TR driven by the drive circuit 52 by using the temperature sensor TS, then determining, for example, whether the temperature exceeds the temperature corresponding to the first threshold VT1 or not, and controlling the driving of the drive circuit 52, based on the result of the determination, is formed, as shown in A1 in FIG. 12.

The temperature detection value of the temperature sensor TS is inputted to the A/D conversion circuit 56 and A/D-converted. The data acquired by the A/D conversion is inputted to the control circuit 30, for example, via the memory 60. The control circuit 30 controls the drive circuit 52, based on the digital temperature detection value. For example, as described with reference to FIG. 3, when the control circuit 30 has determined that the temperature detection value exceeds the second threshold VT2, the control circuit 30 performs the second feedback control to perform the control processing for temperature abnormality detection to the drive circuit 52 in the circuit block. Specifically, when the temperature detection value exceeds the second threshold VT2, the control circuit 30 performs the control processing for temperature abnormality detection to stop the operation of the circuit block or set the circuit block into the low power consumption mode.

In this way, in the control circuit 30 and the circuit block, a loop of the second feedback control in which the control circuit 30 monitors the heat generation of the drive transistor TR driven by the drive circuit 52 by using the temperature sensor TS, then determines, for example, whether the temperature exceeds the temperature corresponding to the second threshold VT2 or not, and controls the driving of the drive circuit 52, based on the result of the determination, is formed, as shown in A2 in FIG. 12.

Also, the data acquired by the A/D conversion circuit 56 A/D-converting the temperature detection value of the temperature sensor TS is transmitted as monitoring data to the processing device 90, for example, via the memory 60 and the output interface 42. For example, as described with reference to FIG. 5, when the processing device 90 has determined that the temperature detection value exceeds the third threshold VT3, the processing device 90 transmits instruction information for operation instruction to the circuit device 20. Then, the input interface 41 of the circuit device 20 receives the instruction information, and the control circuit 30 controls the drive circuit 52, based on the received instruction information. For example, the third feedback control, in which the control circuit 30 executes the control processing for temperature abnormality detection when the temperature detection value exceeds the third threshold VT3, based on the instruction information, is performed.

In this way, in the processing device 90, the control circuit 30, and the circuit block, a loop of the third feedback control in which the processing device 90 monitors the heat generation of the drive transistor TR driven by the drive circuit 52 by using the temperature sensor TS, then determines, for example, whether the temperature exceeds the temperature corresponding to the third threshold VT3 or not, and outputs the instruction information to control the driving of the drive circuit 52, based on the result of the determination, is formed, as shown in A3 in FIG. 12.

Figure 13:
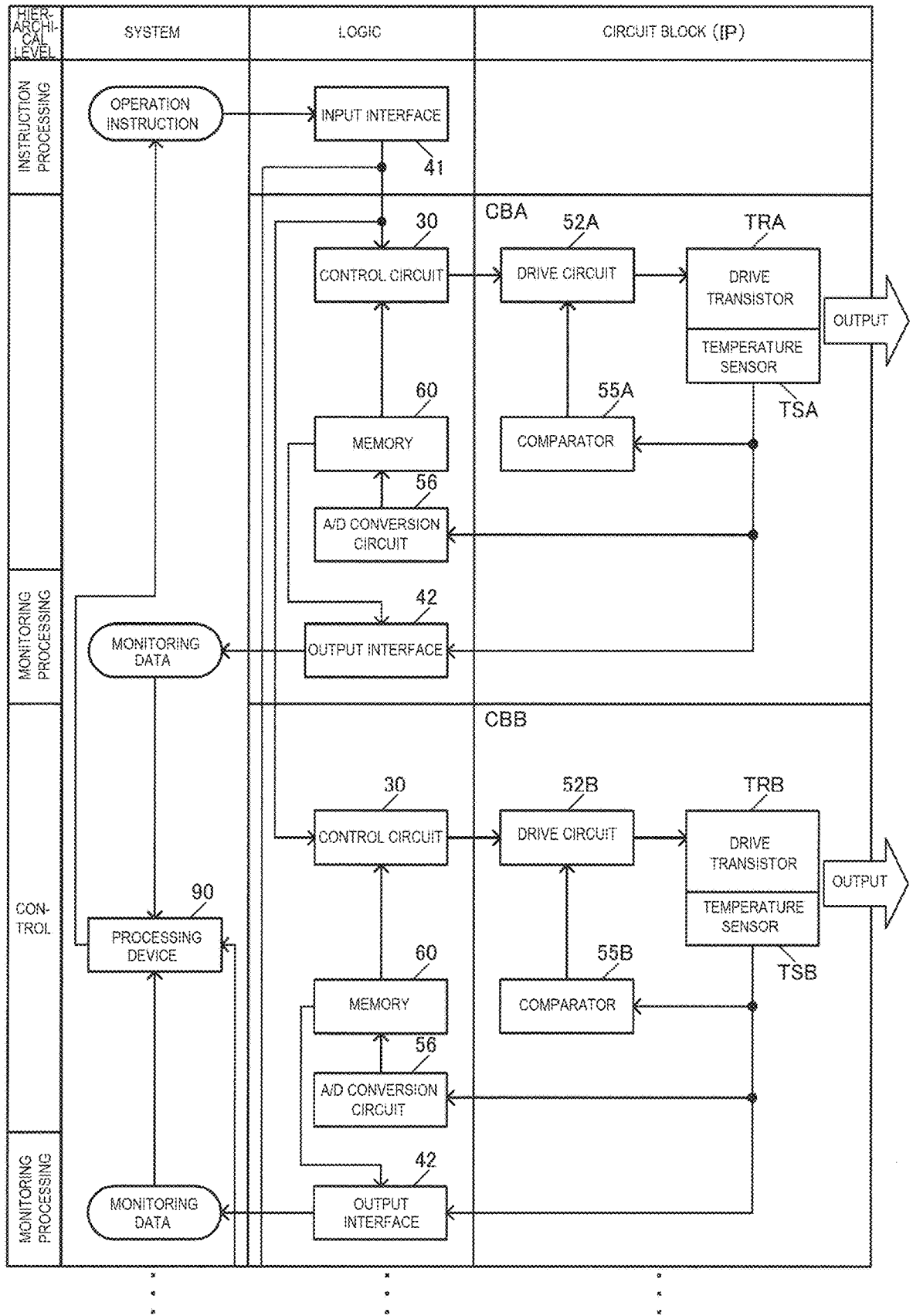
FIG. 13 is an explanatory view showing a feedback control loop at each hierarchical level.

FIG. 13 is an explanatory view showing the feedback control loop at each hierarchical level in the case where the circuit device 20 includes a plurality of circuit blocks. In FIG. 13, a plurality of circuit blocks such as a circuit block CBA having a drive circuit 52B, a drive transistor TRA, a temperature sensor TSA, and a comparator 55A, and a circuit block CBB having a drive circuit 52B, a drive transistor TRB, a temperature sensor TSB, and a comparator 55B, are provided in the circuit device 20. The loop of the first feedback control described with reference to A1 in FIG. 12 is formed in the circuit block CBA. The loop of the first feedback control is also formed in the circuit block CBB. In the control circuit 30 and the circuit blocks CBA, CBB, the loop of the second feedback control is formed. In the processing device 90, the control circuit 30, and the circuit blocks CBA, CBB, the loop of the third feedback control is formed.

As described above, at least one circuit block of the plurality of circuit blocks includes the drive transistor TR driving an external load, and the drive circuit 52 for the drive transistor TR, as shown in FIGS. 12 and 13. At least the one circuit block performs the first feedback control to control the drive circuit 52, based on the temperature detection value of the temperature sensor TS. Thus, in the circuit block having the drive transistor TR and the drive circuit 52, the first feedback control to control the drive circuit 52, based on the temperature detection value of the temperature sensor TS, can be implemented. For example, when the temperature sensor TS has detected a temperature abnormality state of the drive transistor TR, the first feedback control in which the control processing for temperature abnormality detection is performed to the drive circuit 52 so as to resolve the temperature abnormality state can be implemented. Thus, for example, power management that can comply with the safe operating area or the like of the drive transistor TR can be implemented.

For example, in the drive transistor TR implemented by a power MOSFET or the like, when the temperature in the channel area exceeds a predetermined temperature, for example, 150° C. or the like, a situation such as the breakdown of the transistor occurs. In this case, the occurrence of such a situation can be prevented by performing the first feedback control to control the drive circuit 52, based on the temperature detection value of the temperature sensor TS.

Also, in this embodiment, the control circuit 30 performs the second feedback control to control the drive circuit 52, based on the temperature detection value of the temperature sensor TS, as shown in FIGS. 12 and 13. Thus, in the loop including the control circuit 30 and the circuit block, the second feedback control to control the drive circuit 52, based on the temperature detection value of the temperature sensor TS, can be implemented. For example, when the temperature sensor TS has detected a temperature abnormality state of the drive transistor TR, the second feedback control in which the control circuit 30 performs the control processing for temperature abnormality detection to the drive circuit 52 so as to resolve the temperature abnormality state can be implemented. Thus, the second feedback control by the control circuit 30 at a higher level is performed in addition to the first feedback control in the circuit block, and for example, power management that can comply with the safe operating area or the like of the drive transistor TR can be implemented.

Also, in this embodiment, each feedback control loop of the plurality of feedback control loops is provided for each hierarchical level, as shown in FIGS. 12 and 13. For example, in the loop of the first feedback control shown in A1 in FIG. 12, the control in each circuit block, which is an IP core, is performed, based on the temperature detection value. Meanwhile, in the loop of the second feedback control shown in A2, the control by the control circuit 30, which is at a higher level than the circuit block, is performed, based on the temperature detection value. In the loop of the third feedback control shown in A3, the control by the processing device 90, which is at a higher level than the control circuit 30, is performed, based on the temperature detection value. Also, in this embodiment, the feedback control loops can be used properly, based on the time scale. For example, transient instantaneous power is controlled in each circuit block. Meanwhile, average power is controlled by the control circuit 30, which is at a higher level than the circuit block. Target power is controlled by the processing device 90 of the system at a higher level than the control circuit 30. Also, in this embodiment, the feedback control loops can be used properly, based on the load state. For example, overload driving is controlled in each circuit block. Light-load driving is controlled by the control circuit 30, which is at a higher level than the circuit block. Derating is controlled by the processing device 90 of the system at a higher level than the control circuit 30. The derating is temperature derating and refers to causing an electronic component to operate at a predetermined rated capability or below, according to the ambient temperature and the operating temperature.

In this embodiment, for example, when the temperature detection value exceeds the third threshold VT3, the processing device 90 of the system controlling the entirety of a finished product such as an electronic device including the circuit device 20 is notified. The processing device 90 is in a position to give the circuit device 20 an instruction about what processing to execute next. Therefore, if the high-load state continues for the time being, the processing device 90 stops the operation of the circuit device 20 and the circuit block or sets the circuit device 20 and the circuit block into the low power consumption mode. If the operation state of the circuit device 20 and the circuit block returns to the low-load state after a while, the processing device 90 causes the circuit device 20 and the circuit block to continue operating.

When the temperature detection value exceeds the second threshold VT2 higher than the third threshold VT3, the control circuit 30 controlling the entirety of the circuit device 20 performs control to adjust the operation of a plurality of circuit blocks. For example, the control circuit 30 strikes a balance between the powers consumed by the plurality of circuit blocks and thus prevents a temperature rise.

When the temperature detection value exceeds the first threshold VT1 higher than the second threshold VT2, the operation of the corresponding circuit block immediately stops. For example, if the circuit block waits for a stop instruction from the control circuit 30, the circuit block may break down while waiting. Therefore, the circuit block itself performs determination and stops operating.

3. Application Example

Figure 14:
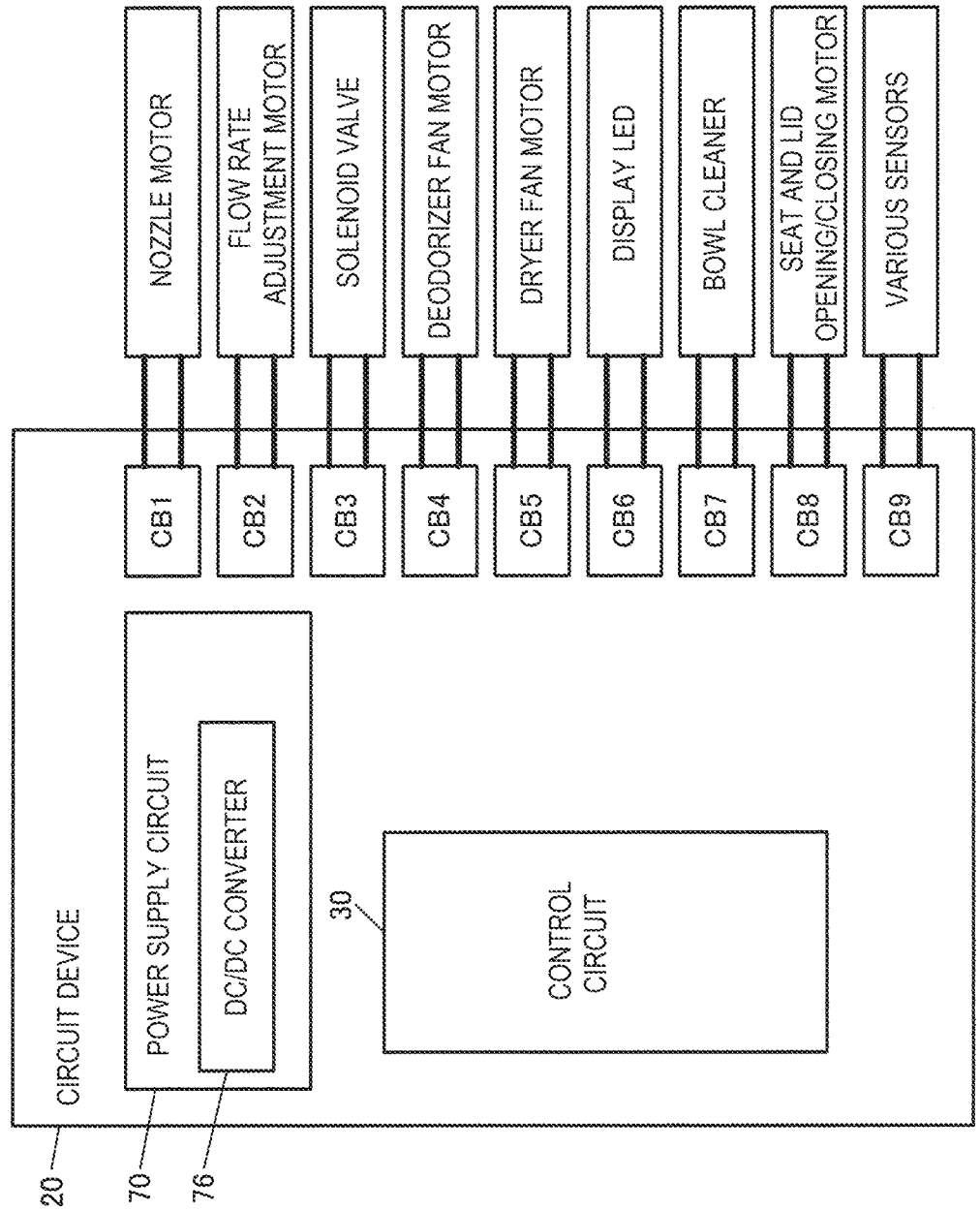
FIG. 14 shows an example of applying the circuit device to a toilet system.

A specific application example of the circuit device 20 according to the embodiment will now be described. FIG. 14 shows an example of the configuration in the case where the circuit device 20 according to the embodiment is applied to a toilet system. The toilet system has a nozzle motor, a flow rate adjustment motor, a solenoid valve for water supply control, a deodorizer fan motor, a dryer fan motor, a display LED, a bowl cleaner, a seat and lid opening/closing motor, and various sensors detecting the entry of a user into the toilet room or the sitting of the user on the seat, or the like. The circuit device 20 is provided with circuit blocks CB1 to CB9 corresponding to these components. For example, the circuit blocks CB1, CB2, CB4, CB5, CB8 have a drive transistor and a drive circuit for driving the motors for the nozzle, flow rate adjustment, deodorization, drying, and seat and lid opening/closing. The power supply circuit 70 is provided with the DC/DC converter 76 described with reference to FIG. 11. A power-supply voltage generated by the DC/DC converter 76 is supplied to the toilet system.

Figure 15:
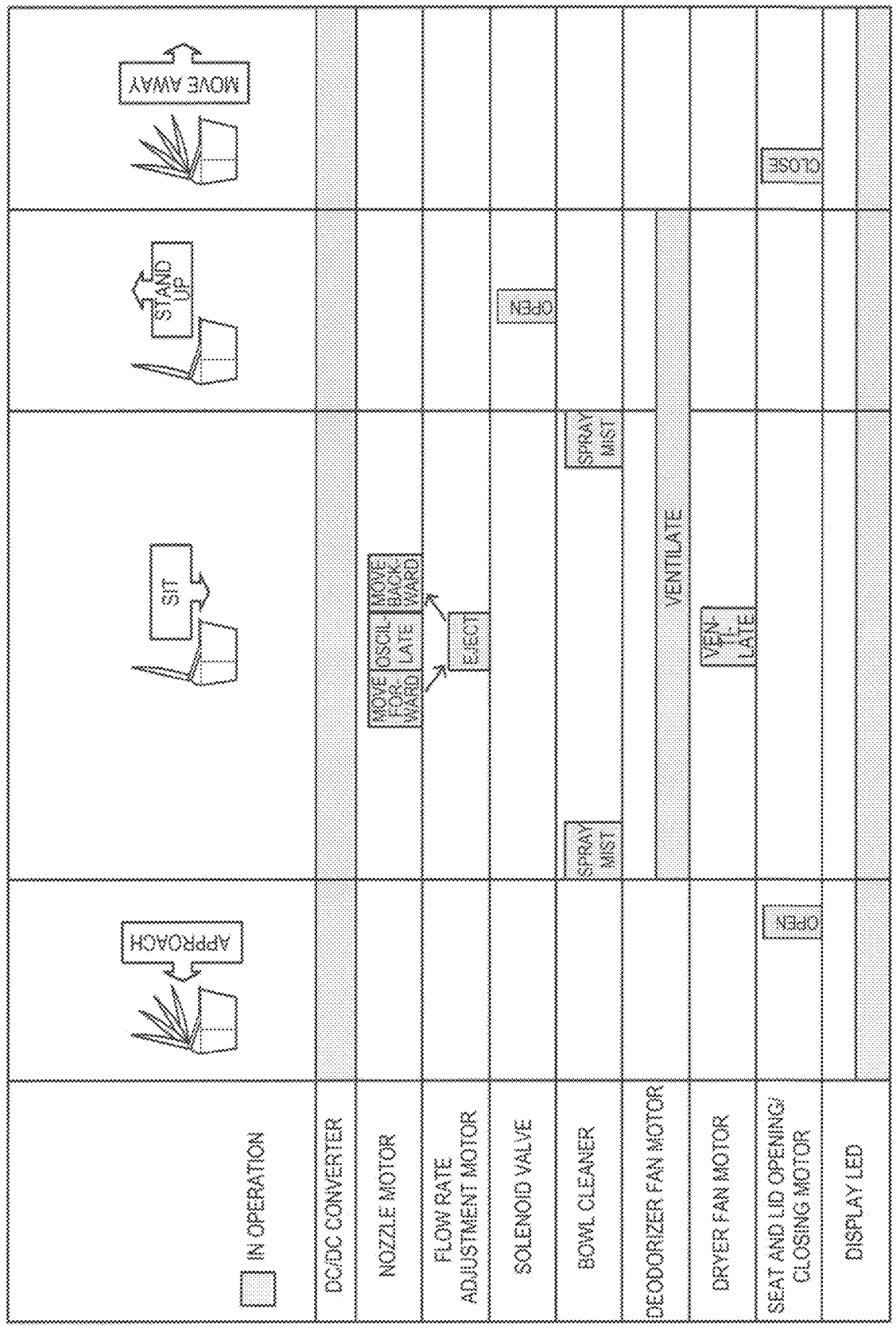
FIG. 15 is an explanatory view of the operation of the toilet system.

FIG. 15 is an explanatory view of the operation of the toilet system. As shown in FIG. 15, the DC/DC converter 76 is constantly in operation and supplies a power-supply voltage. When the user approaches the bowl, the seat and lid opening/closing motor opens the toilet lid. Subsequently, the bowl cleaner unit sprays a mist and the deodorizer fan motor performs ventilation. After the user sits on the seat, the nozzle motor performs forward movement, oscillation, and backward movement of the spray nozzle, and the flow rate adjustment motor ejects the cleaning water from an ejection port in the spray nozzle. Also, the dryer fan motor performs ventilation. When the user stands up from the seat and moves away from the bowl, the seat and lid opening/closing motor closes the toilet lid.

In the example of application to the toilet system shown in FIGS. 14 and 15, the operation of each circuit block is given a priority order and thus controlled, based on the temperature detection value. In the second feedback control, the control circuit 30 performs operation control, based on the state of each circuit block in the circuit device 20. In the third feedback control, the processing device 90 of the system performs operation control including the adjustment of a scheduled operation. In an example, the priority order in the toilet system is defined in the following manner: nozzle motor>flow rate adjustment motor >solenoid valve>bowl cleaner>deodorizer fan motor >dryer fan motor >seat and lid opening/closing motor >display LED>buzzer. The processing device 90 of the system performs operation control, based on this priority order. For example, in the second feedback control in the embodiment, control is performed without taking the time axis into account. For example, in the second feedback control, the power consumed in the toilet system is smoothed. For example, when the amount t of power consumed in any circuit block is distinctly high, the control circuit 30 performs the second feedback control to reduce the power consumed in this circuit block and thus restrain power consumption. Meanwhile, in the third feedback control, control is performed, taking the time axis into account. For example, when a delay is likely to occur due to the second feedback control by the control circuit 30, the processing device 90 of the system performs control to change the order, based on the foregoing priority order, or the like.

As described above, the circuit device according to the embodiment includes: a plurality of circuit blocks, each circuit block being provided with at least one temperature sensor; and a control circuit controlling the plurality of circuit blocks. Each circuit block performs first feedback control for temperature abnormality detection, based on a temperature detection value of the temperature sensor provided in each circuit block. The control circuit performs second feedback control for temperature abnormality detection to each circuit block of the plurality of circuit blocks, based on the temperature detection value of the temperature sensor.

According to the embodiment, a plurality of circuit blocks provided with a temperature sensor, and a control circuit controlling the plurality of circuit blocks, are provided in the circuit device. Each circuit block performs first feedback control for temperature abnormality detection based on a temperature detection value of the temperature sensor, and the control circuit performs second feedback control for temperature abnormality detection based on the temperature detection value. Thus, a plurality of feedback control loops can be provided separately for each hierarchical level and used properly according to need, such as the first feedback control in each circuit block and the second feedback control by the control circuit at a higher level. Therefore, power management that can comply with the safe operating area of the circuit block can be implemented, using the temperature sensor.

In the embodiment, as the first feedback control, each circuit block may perform feedback control to stop the operation of each circuit block when the temperature detection value of the temperature sensor provided in each circuit block exceeds a first threshold. As the second feedback control, the control circuit may perform feedback control to perform control processing for temperature abnormality detection to each circuit block when the temperature detection value exceeds a second threshold that is lower than the first threshold.

Thus, when the temperature detection value exceeds the first threshold, the operation of the circuit block can be stopped by the first feedback control in the circuit block. When the temperature detection value exceeds the second threshold, the control processing for temperature abnormality detection can be performed to the circuit block by the second feedback control by the control circuit at a higher level.

In the embodiment, the control circuit may perform the control processing for temperature abnormality detection to stop the operation of each circuit block or set each circuit block into a low power consumption mode when the temperature detection value exceeds the second threshold.

Thus, the operation of the circuit block is stopped or the circuit block is set into the low power consumption mode before the temperature in the circuit block reaches the temperature corresponding to the first threshold, and the temperature in the circuit block can thus be controlled not to rise.

In the embodiment, at least one circuit block of the plurality of circuit blocks may include a drive transistor driving an external load, and a drive circuit for the drive transistor. At least the one circuit block may perform the first feedback control to control the drive circuit, based on the temperature detection value of the temperature sensor.

Thus, the first feedback control to control the drive circuit, based on the temperature detection value of the temperature sensor, can be implemented in the circuit block having the drive transistor and the drive circuit.

In the embodiment, the control circuit may perform the second feedback control to control the drive circuit, based on the temperature detection value.

Thus, the second feedback control to control the drive circuit, based on the temperature detection value of the temperature sensor, can be implemented in a loop including the control circuit and the circuit block.

In the embodiment, the circuit device may include an interface circuit communicating with an external processing device. The interface circuit may perform notification processing about the temperature detection value of the temperature sensor to the processing device in order to cause the processing device to perform third feedback control for temperature abnormality detection.

Thus, the external processing device can execute the third feedback control based on the temperature detection value, based on information acquired through the notification processing. The third feedback control for temperature abnormality detection by the processing device, which is at a higher level than the control circuit, can be implemented.

In the embodiment, the control circuit may receive instruction information based on the third feedback control from the processing device via the interface circuit and control each circuit block.

Thus, the third feedback control by the processing device corresponding to the notification processing about the temperature detection value can be implemented by the control of the circuit block by the control circuit, using the instruction information from the processing device.

In the embodiment, as the first feedback control, each circuit block may perform feedback control to stop the operation of each circuit block when the temperature detection value of the temperature sensor provided in each circuit block exceeds a first threshold. As the second feedback control, the control circuit may perform feedback control to perform control processing for temperature abnormality detection to each circuit block when the temperature detection value exceeds a second threshold that is lower than the first threshold. As the notification processing, the interface circuit may perform the notification processing to cause the processing device to perform the third feedback control when the temperature detection value exceeds a third threshold value that is lower than the second threshold.

Thus, whether the temperature detection value exceeds the first threshold, the second threshold or the third threshold or not is determined and the feedback control by the circuit block, the control circuit, or the processing device of the corresponding hierarchical level can be implemented.

The embodiment also relates to a processing system including the foregoing circuit device and a processing device performing the third feedback control.

The embodiment has been described above in detail. However, a person skilled in the art can readily understand that various modifications can be made without substantially departing from the new matters and effects of the present disclosure. Therefore, all such modification examples are included in the scope of the present disclosure. For example, in the specification or the drawings, a term described along with a different term having a broader meaning or the same meaning, at least once, can be replaced with the different term at any point in the specification or the drawings. Also, all combinations of the embodiment and modification examples are included in the scope of the present disclosure. The configurations and operations or the like of the circuit device and the processing system are not limited to those described in the embodiment and can be implemented with various modifications.

What is claimed is:

1. A circuit device comprising: a plurality of circuit blocks, each circuit block being provided with at least one temperature sensor; and a control circuit controlling the plurality of circuit blocks, the each circuit block performing first feedback control for itself for temperature abnormality detection, based on a temperature detection value of the at least one temperature sensor provided in the each circuit block, the control circuit performing second feedback control for temperature abnormality detection to the each circuit block of the plurality of circuit blocks, based on the temperature detection value of the at least one temperature sensor.

2. The circuit device according to claim 1, wherein
the each circuit block
performs the first feedback control to stop an operation of the each circuit block when the temperature detection value of the at least one temperature sensor provided in the each circuit block exceeds a first threshold, and
the control circuit
performs, as the second feedback control to perform control processing for temperature abnormality detection to the each circuit block when the temperature detection value exceeds a second threshold that is lower than the first threshold.

3. The circuit device according to claim 2, wherein
the control circuit
performs the control processing for temperature abnormality detection to stop the operation of the each circuit block or set the each circuit block into a low power consumption mode when the temperature detection value exceeds the second threshold.

4. The circuit device according to claim 1, wherein
at least one circuit block of the plurality of circuit blocks includes:
a drive transistor driving an external load; and
a drive circuit for the drive transistor, and
the at least one circuit block
performs the first feedback control to control the drive circuit, based on the temperature detection value of the at least one temperature sensor.

5. The circuit device according to claim 4, wherein
the control circuit
performs the second feedback control to control the drive circuit, based on the temperature detection value.

6. The circuit device according to claim 1, further comprising:
an interface circuit communicating with an external processing device, wherein
the interface circuit
performs notification processing about the temperature detection value of the at least one temperature sensor provided in the each circuit block to the external processing device in order to cause the external processing device to perform a third feedback control for temperature abnormality detection.

7. The circuit device according to claim 6, wherein
the control circuit
receives instruction information based on the third feedback control from the external processing device via the interface circuit and controls the each circuit block.

8. The circuit device according to claim 6, wherein
the each circuit block
performs the first feedback control to stop an operation of the each circuit block when the temperature detection value of the at least one temperature sensor provided in the each circuit block exceeds a first threshold,
the control circuit,
performs the second feedback control to perform control processing for temperature abnormality detection to the each circuit block when the temperature detection value exceeds a second threshold that is lower than the first threshold, and
the interface circuit
performs, as the notification processing to cause the external processing device to perform the third feedback control when the temperature detection value exceeds a third threshold value that is lower than the second threshold.

9. A processing system comprising:
the circuit device according to claim 6; and
the external processing device performing the third feedback control.

* * * * *